US007003501B2

(12) United States Patent
Ostroff (10) Patent No.: US 7,003,501 B2
(45) Date of Patent: Feb. 21, 2006

(54) METHOD FOR PREVENTING FRAUDULENT USE OF CREDIT CARDS AND CREDIT CARD INFORMATION, AND FOR PREVENTING UNAUTHORIZED ACCESS TO RESTRICTED PHYSICAL AND VIRTUAL SITES

(76) Inventor: Maurice Ostroff, 501 Beit Protea 5 Asher Barash Street, Herzliya 46365 (IL)

( * ) Notice: Subject to any disclaimer, the term of this patent is extended or adjusted under 35 U.S.C. 154(b) by 753 days.

(21) Appl. No.: 09/779,613

(22) Filed: Feb. 9, 2001

(65) Prior Publication Data
US 2002/0046092 A1    Apr. 18, 2002

Related U.S. Application Data

(60) Provisional application No. 60/239,035, filed on Oct. 10, 2000, provisional application No. 60/226,583, filed on Aug. 21, 2000, provisional application No. 60/205,546, filed on May 22, 2000, provisional application No. 60/181,998, filed on Feb. 11, 2000.

(51) Int. Cl.
*G06F 17/60* (2006.01)

(52) U.S. Cl. ............................. 705/76; 705/1; 705/60; 705/67; 705/74; 705/76; 705/400; 380/25; 380/30; 380/51; 380/55

(58) Field of Classification Search ................ 705/67, 705/74; 380/25, 30, 51
See application file for complete search history.

(56) References Cited

U.S. PATENT DOCUMENTS

| | | | | |
|---|---|---|---|---|
| 4,529,870 A | * | 7/1985 | Chaum | 235/380 |
| 4,926,480 A | * | 5/1990 | Chaum | 705/69 |
| 5,677,955 A | * | 10/1997 | Doggett et al. | 705/76 |
| 6,000,832 A | * | 12/1999 | Franklin et al. | 700/232 |
| 6,884,172 B1 | * | 4/2005 | Lloyd et al. | 463/42 |
| 2003/0028481 A1 | * | 2/2003 | Flitcroft et al. | 705/39 |

FOREIGN PATENT DOCUMENTS

DE    19642575 A1 *  5/1999

OTHER PUBLICATIONS

The Future of Transactional Card Technologies. Urrows, Henry; Urrows, Elizabeth. Optical Information Systems, vol.: 0, No.: 4, p.: 190(19), Jul.-Aug. 1989.*

\* cited by examiner

*Primary Examiner*—James P. Trammell
*Assistant Examiner*—Daniel L. Greene
(74) *Attorney, Agent, or Firm*—Edward Langer, Pat. Atty; Shiboleth, Yisraeli, Roberts, Zisman & Co.

(57) ABSTRACT

A method and a system for enabling secure authentication of a user in a computerized card access transaction. A card, identified by an identification number is issued to the user, containing software for generating a surrogate number referred to as a Cybercoupon for use in place of the regular card number. Online intrusion is avoided and the system is rendered portable for use on any computer equipped with a compatible operating system, by avoiding storage of any part of the system on the user's computer, placing the entire system instead on the card itself. The card contains advertising which appears on the user's computer screen. The card is protected by a password. If an incorrect password is entered more than a preset number of times, an "alert" Cybercoupon is generated containing a code advising the card issuer that an irregular attempt has been made to access the card.

20 Claims, 7 Drawing Sheets

Combined Magnetic Stripe / Smartcard

Figure 7

METHOD FOR PREVENTING FRAUDULENT USE OF CREDIT CARDS AND CREDIT CARD INFORMATION, AND FOR PREVENTING UNAUTHORIZED ACCESS TO RESTRICTED PHYSICAL AND VIRTUAL SITES

CROSS REFERENCE TO RELATED APPLICATIONS

The present invention is an extension and improvement of U.S. Provisional Patent Applications filed by the present inventor, as follows:

Ser. No. 60/181,998, entitled "A Method for Preventing Fraudulent Use of Credit cards or Credit Card Information" filed on Feb. 11, 2000, Ser. No. 60/205,546 filed on May 22, 2000, entitled "A Method For Preventing Fraudulent Use Of Credit Cards, Credit Card Information, and Unauthorized Access To Restricted Physical Or Virtual Sites"

Ser. No. 60/226,583 filed on Aug. 21, 2000 and entitled "A Method For Preventing Fraudulent Use Of Credit Cards, Credit Card Information, and Unauthorized Access To Restricted Physical Or Virtual Sites"

Ser. No. 60/239,035 entitled "A Method For Preventing Fraudulent Use Of Credit Cards And Credit Card Information and For Preventing Unauthorized Access To Restricted Physical Or Virtual Sites" filed on Oct. 10, 2000.

Each of the above applications is hereby incorporated by reference in its entirety herein.

FIELD OF THE INVENTION

The invention is directed to the prevention of fraudulent use of online and offline card payment and access systems, such as credit, debit and other charge cards, access cards and telephone calling cards and to prevention of unauthorized access to a local computer and to remote computers connected online and prevention of unauthorized access to virtual and physical sites generally.

BACKGROUND OF THE INVENTION

The existence of a black market in credit card information is well known and it is believed that the real extent of this type of crime is much greater than published mainly because of the fear by the victims of negative publicity. Typical is the headline carried by *The International Herald Tribune* (*IHT*) of Jan. 11, 2000 "On-line Intruder Steals 300,000 Credit card Files". The culprit had reportedly stolen the files from a well-known Internet music retailer.

While the IHT report refers to the stealing of credit card information electronically, the phenomenon is not confined to electronic means. Unscrupulous persons obtain the information by sorting through trash, stealing mail, or working in temporary jobs in stores or banks. Once the credit card information falls into the wrong hands the culprit can place multiple orders telephonically or on-line for purchases to any value within the card owners credit limit. In particular when it comes to buying immediate on-line services, the culprit has little if any difficulty. No delivery addresses are required, the service is received and paid for in real-time with a false credit card and there is no recourse to the culprit.

Elaborate methods have been devised to prevent fraud including encryption of card information during passage from user to merchant using systems such as public and private key encryption; in some cases in conjunction with smartcards which provide for greater security in verifying the authenticity of the card and the identity of the card user. A critical problem which has been inadequately addressed until recently is that once the user's name, card number and expiry date have been decrypted, said decrypted information stored on a vendor's computer is prone to abuse. Unauthorized persons who gain access to the information, are able to continue using it to make credit purchases until the relevant card is canceled by the card issuer. This problem is compounded by the delay which may be incurred before a fraud is detected and steps taken to cancel the card. Various "disposable" one-time surrogate card number systems have recently been introduced to overcome this weakness but where the software relating to such systems is stored on user's computer it continues to be exposed to online intruders.

The problem has been aggravated by the growing ease with which so called hackers are able to penetrate computers, decode passwords, read information to which they are not entitled and to present false identities. Nowadays hackers or crackers have access to very sophisticated software known as sniffers, scanners, web bugs and the like which enable them to unravel passwords and read information on individual computers easily and speedily. In addition, e-commerce security systems which are stored on a user's computer can be copied by unauthorized persons on-line or by unauthorized persons who gain physical access to the computer.

In many present systems the validity check does not usually include verification that the person initiating a card transaction is in fact the legitimate owner of the card as passwords are easily broken. Third party certification authorities (CA's) are often engaged to check the legitimacy of credit purchase applications. It has however been authoritatively reported that such screening may lead to unnecessary rejection of legitimate sales.

The prior art of card-enabled transaction authentication has numerous examples of methods designed to raise the level of security against fraud in these transactions.

U.S. Pat. No. 6,012,144 to Pickett utilizes two or more non-secure networks (such as the Internet and the public telephone system) to initiate and validate a transaction. The user uses a non-secure network to contact a card issuer and the card issuer verifies the identity of the user by a telephone callback system. This method can easily become a burden on heavily-trafficked phone systems, especially at peak hours, and is time-consuming.

U.S. Pat. No. 4,961,142 to Elliot et. al. describes the use of multi-user transaction devices, such as various types of credit cards, issued by different credit authorities. These are processed using a number of matching modules which are programmed to read such credit cards.

U.S. Pat. No. 5,478,993 to Derksen discloses a card having four memories including data for doing an identity check of the card ownership and an authenticity check.

U.S. Pat. No. 5,991,738 to Ogram discloses an automated payment system for purchases over the Internet, in which the customers computer is linked to a payment processing computer and the customer's credit card number and transaction amount are transmitted to it. The payment-processing computer automatically contacts the bank for verification, and communicates a self-generated transaction indicator, and a password, to protect the transaction.

U.S. Pat. No. 6,005,939 to Fortenberry, et al., describes a passport type system for use over the Internet for secure transactions or data transfers. It employs a user-initiated process to forward a passport containing encrypted information from a passport agent to a recipient node and forwards a key to the recipient node to unlock the passport information.

U.S. Pat. No. 4,628,195 to Baus for a credit card security system includes a system to generate a security code number determined by the spatial positions of corresponding data in two different forms of encoded data on the card. The system generates the security code number each time a card is used and compares it to a stored security number generated in the same way when the card was first encoded or previously used. The system is described in terms of a card having a familiar magnetic stripe and embossed character encoding, and apparatus for sensing the embossed characters is disclosed.

U.S. Pat. No. 5,163,098 to Dahbara is a system for preventing fraudulent use of credit cards using an encryption algorithm to generate a first encoded text from the card number and a password supplied by the user. The card user is verified by comparison of the first encoded text with an encoded text recorded on the card. When the transaction is completed, the merchant generates a receipt containing a first verification code generated from the date and time of the transaction, the merchant's identification number, the password, and the card number. To receive payment, the merchant presents the receipt to the card authorization center. The card center generates a second verification code from the card number, the password which is retrieved from the central database, the merchant number, and the time and date of the transaction. If the two verification codes match, the merchant is credited with the amount of the transaction.

U.S. Pat. No. 4,630,201 to White discloses a security system which includes a central processor and a portable transaction device both having an internal memory, said system being particularly directed towards providing greater security and reliability in check writing and in which a sequence of transaction numbers and associated random numbers are generated and stored in a portable transaction device. A security code is generated by combining one of the random numbers with a transaction parameter, and this code may be verified by a central processor. In the preferred embodiment, in the on-line operation, the selection of the random number is altered by a random offset number further enhancing security. The system includes the assigning of one of the transaction numbers (e.g., a check number) to each transaction and thereafter generating a security code derived by combining data representative of a transaction parameter and a random number and the random number listed in a table that is associated with the particular transaction number assigned to the present transaction. The user enters a transaction number in order to ascertain the relevant random number. The transaction number and the random number comprise in effect a single new code number of combined length. The system is intended for enhancing security in acceptance of checks and is unsuitable for the types of transactions envisaged by the present invention.

In U.S. Pat. No. 5,883,810 to Franklin et al. and assigned to Microsoft Corporation in March 1999, a physical card is not used, but exists only in digital form. During initial registration, the user downloads a registration module from the card issuer's site on the Web to the user's computer, where it is exposed to online intrusion or by a person who may gain unauthorized physical access to said computer. The system is not portable and use of the module is restricted to said specific computer. Each time the user desires to conduct an online transaction, said user is required to ask the card issuer to issue a proxy transaction number for a single transaction. The issuing institution generates a temporary transaction number and associates it with the permanent account number in a data record. The transaction number has a predetermined finite life (suggested by the inventor between one half hour to two hours).

Therefore, it would be desirable to provide a system which benefits from all the advantages of one time surrogate card numbers, while providing additional security, and in particular, which addresses the aforementioned security weakness of systems which are stored on a user's computer as well as the inherent lack of portability. The aforementioned methods limit the user to use of the system only on the designated computer, and they are therefore unsuitable for use at over the counter locations, for physical access control, or while travelling.

SUMMARY OF THE INVENTION

Accordingly, it is a principal object of the present invention to overcome the disadvantages of presently available systems and to provide a system for preventing fraudulent card transactions, comprising a physical card to be used by a user, with the card containing a program which generates a unique one-time disposable number, word or character string referred to as a Cybercoupon. The Cybercoupon is used as a surrogate card number in lieu of a regular card number, for example in credit card transactions. Alternatively, the Cybercoupon may be used as a password for gaining access to a local or remote computer, a network or a physical or virtual site. The system is designed so that the entire user interface is stored on said physical card avoiding storage on a computer of any part of said user program which can be susceptible to unauthorized intrusion or hacking.

The invention can be summarized as a system that can:

generate a one-time Cybercoupon comprising a number or a word for use as a surrogate card number in lieu of a regular card number for example in credit card transactions or as a password for gaining access to a computer, a network or a physical or virtual site;

be isolated from on-line hacking by requiring no component of the user program which may be susceptible to unauthorized intrusion to be stored on the user's computer and by automatically disconnecting the card from the computer when not required for generating a Cybercoupon be protected against illegal copying and hacking notify, where applicable, the value of each purchase order and the identity of the vendor to the card issuer so that only the specific intended transaction will be authorized if such authorization by the card issuer is required before the vendor may give effect to the transaction be completely portable and independent of any writable data on the user's computer and is adaptable for operation with any common operating system such as Windows, Macintosh, Unix, Linux and the like;

include a means of authenticating the user of the card, by protecting the card with a password in a manner whereby the card issuer is notified if an incorrect password is successively entered provide for advertising messages on the user's screen thereby providing an additional source of revenue for the card issuer provide a secure medium for storing encryption keys and an encryption algorithm enable the encrypting of text for local secure storage on a user's computer or for transmission to a remote computer and a means of interacting with the user's email program enabling the transmission of said encrypted email messages provide a means for the generation and transmission of a secure encrypted password for gaining access to a computer or a site, locally or remotely via the internet or independently of the internet;

provide a means for converting a Cybercoupon to audio tones which can be transmitted by telephone or other means of audio communication for usual types of card transactions or for use with a telephone calling card alternatively use a card that can be in the format of a paper or plastic document containing written text and that can be used without a computer;

Card transactions envisaged in this invention primarily involve an assigned card holder (hereinafter the user), a vendor and a card issuer.

Except in the case of the system described hereafter under the heading Non Digital Cards, the card takes the form of a digitally recordable medium i.e. a computer readable device such as a diskette, a compact disc (CD), a smartcard or the like, identified by a unique identification number (ID) and containing software for generating a unique one time number or word referred to as a Cybercoupon for use in a card transaction in place of the user's regular card number or for obtaining access to a local or remote computer or to a physical or virtual site.

The vendor may be an individual, an organization, a business or other entity providing goods or services (including banking, insurance, travel, or commodity and stock brokering), information, entertainment and the like or a machine such as a vending machine or a means for controlling access to a physical site. The invention is applicable to:

single party transactions wherein the card is used to interact with the user's computer and/or to control access to a the user's computer or to a local network, two-party transactions between a user, a vendor and a card issuer where the vendor and the card issuer are one and the same entity and multiple-party transactions comprising a user, a vendor and a card issuer where the vendor and card issuer are separate entities.

Other parties who may be involved in card transactions of the type envisaged in this invention, include a certification authority (CA), an acquirer a supplier of credit such as a bank or other financial business and/or a third party issuer but such additional parties are not included in the descriptions which follow and are included where applicable in the term card issuer.

For practical purposes, only three principal parties, i.e., the user, the vendor and the card issuer will be considered in describing the mode of operation in multiple party type transactions since the principle of the invention is equally applicable if one or more intermediary parties participate in the process.

In a typical transaction by means of a card, when a user places an order with a vendor, the user supplies the vendor with a card number and date of expiry. The vendor checks the information with the issuer of the card, who advises whether or not the card is valid (i.e., it has not been reported lost or stolen, nor has it been canceled for any reason) and that the value of the transaction is within the credit granted to the card holder.

The Cybercoupon is generated by one of three principal alternative methods each of which is described hereafter viz.

1. The Encrypted Cybercoupon Method wherein an encrypted Cybercoupon containing information is generated for use as a surrogate card number for each transaction 2. The Added Cybercode Method in which the Cybercoupon for use as a surrogate card number for each transaction comprises a combination of the card ID and a unique Cybercode and which method may be used with a non-digital card such as a paper or plastic document or booklet or with a digital card.

3. The Encrypted Password Method in which the Cybercoupon is in the form of an encrypted password used for authenticating the user.

The card is protected by means of a commercially available system such as, but not limited to, Macrovision's SafeDisc® to protect the card from unauthorized replication or copying, to ensure that only the original card can be used and to provide anti-hacking features.

The password for protecting access to the card may comprise one word or several words sequentially. For additional security, provision is made so that if an incorrect password is entered more than a preset number of times, an alert Cybercoupon which has the appearance of a regular Cybercoupon, is generated which contains a code advising the card issuer that an irregular has been made to access the card enabling the card issuer to take such action as it considers appropriate.

Another object of the invention is to ensure that the user is not billed for more than the agreed value of the proposed purchase. For this purpose, in the Encrypted Cybercoupon Method, the Cybercoupon contains encrypted details of the value of the purchase agreed by the user. In the Added Cybercode Method, the user sends a message to the card issuer notifying the value and details of the purchase order and the identity of the vendor. In a preferred embodiment of the invention, it is assumed that the card issuer has allocated a unique identification code to each authorized vendor, which will be readily available to the user so that when the user places an order the user is able to add the identification code of the vendor to the Cybercoupon.

A feature of the invention is the provision of advertising material which appears on the user's screen promoting the card issuer, and/or third parties to whom the relevant advertising space on the card may be sold. The advertising material may include links to web sites enabling the user to readily enter a selection of web shopping areas directly from the user's screen. The advertisements may continue to be displayed after the card has been disconnected from the computer, by opening the relevant drive, or by a software command.

An essential feature of the card is enhanced security in on-line transactions achieved by avoiding the storage of any component of the user program which may be susceptible to hacking on the user's computer. The entire user interface is instead maintained on the card itself. The system is programmed so that after the Cybercoupon has been generated the card is automatically disconnected from the user's computer, or in the case of an over-the-counter transaction, from the vendor's computer thus minimizing exposure to possible on-line intruders.

The card issuer Program at the card issuer's location, permits the card issuer to set conditions for each user ID, such that when the value of the transaction is above a specified amount, or for other specified reasons, the card issuer Program may generate a message to the user asking for verification of the Purchase Order. The user may authenticate such verification by quoting a valid Cybercoupon.

In a preferred embodiment of the invention the card takes the form of a CD resembling the shape and size of a conventional plastic credit card which can be used in a regular CD drive. Optionally the CD includes a chip which can be used with a read or a read/write device so that it can be used alternatively as a regular credit card, a smartcard or as a so-called cash wallet.

Transactions in which a card is not physically presented at the point of transaction and card details are transmitted by telephone, via the Internet or via other means of communication are referred to as Card Not Present. Where the card is presented at the point of transaction such as over-the-counter purchases and other point-of-sale transactions, over-the-counter banking and similar situations the transaction is classed as card Present. Because, in the present invention, it is necessary to insert the card into the appropriate drive of the computer each time it is used and because of the reliable user authentication achieved by the password protection, the card effectively gives Card Not Present transactions the security of Card Present transactions.

The software supplied with the system of the present invention is written so as to be compatible with most existing software platforms well-known to those conversant with the art and can be adapted for the various purposes of the invention including, but not limited to applications such as telecommunications, data storage and transfer, password provision and protection, message encryption, and secure, random-code generation.

Other features and advantages of the present invention will become apparent from the detailed description and examples which follow.

BRIEF DESCRIPTION OF THE DRAWINGS

For a better understanding of the invention with regard to the embodiments hereof, reference is made to the accompanying drawings, in which like numerals designate corresponding elements or sections throughout, and in which.

DETAILED DESCRIPTION OF THE PREFERRED EMBODIMENTS

The drawings illustrate only the main processes used in the invention in the Encrypted Cybercoupon Method as most of the steps used in said Encrypted Cybercoupon Method are common to the alternative methods described herein and the relevant differences are readily understandable. Well known practices in effecting internet purchase transactions or in accessing restricted web sites on the internet or in placing credit card orders telephonically are not illustrated as they are self-evident.

While the invention is designed to permit several differing applications, such as orders placed by telephone, use of the card at stores, for business to business (B2B) transactions and for obtaining access to medical records or banking information and for executing banking transactions and the like, the method used in a typical internet web-based credit purchase transaction as illustrated in the drawings, demonstrates the concept of the invention. Persons acquainted with the art will readily understand the adaptations required for purposes of other applications.

Figure 1:
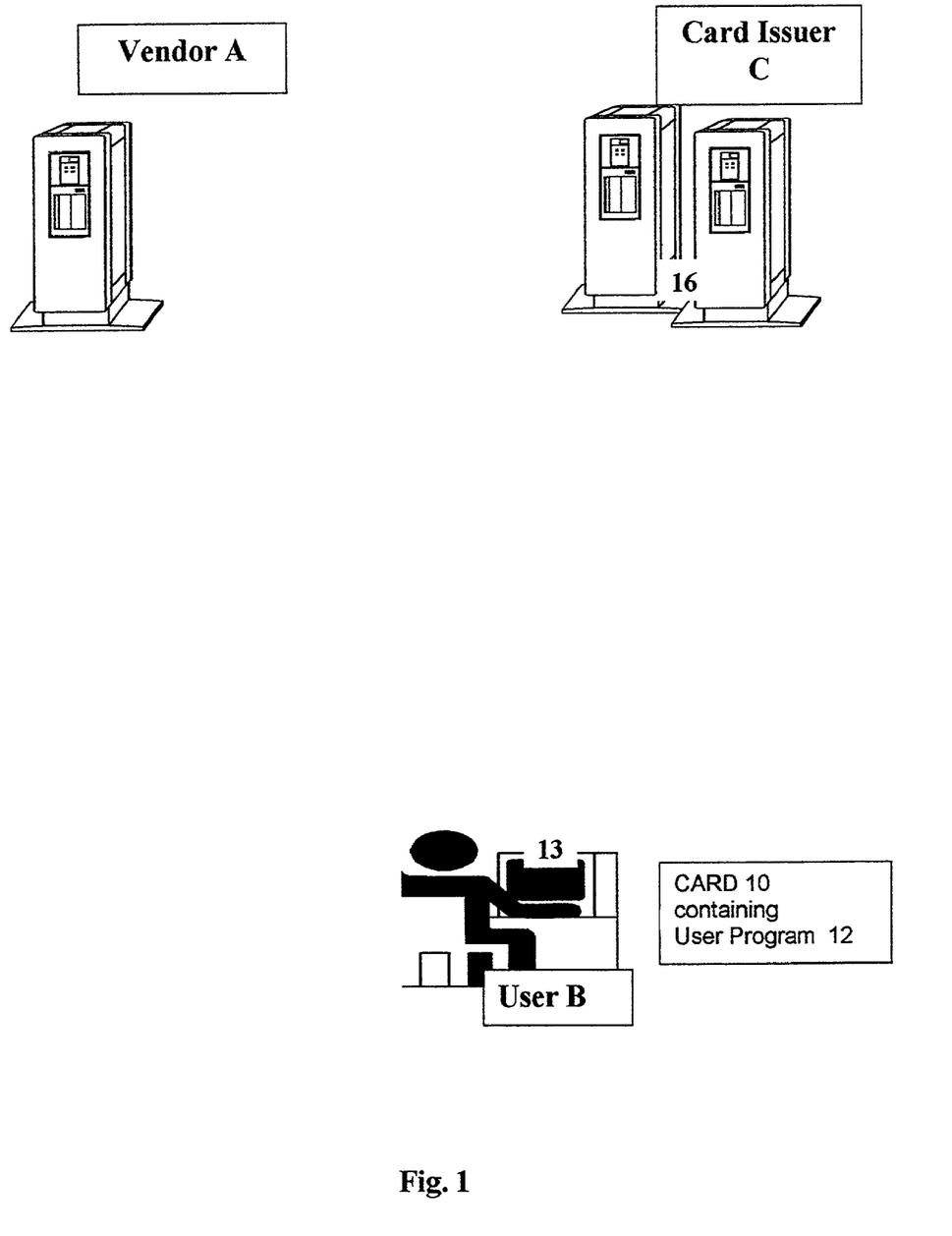
FIG. 1 illustrates the main participants in a typical internet card purchase transaction.

Referring now to FIG. 1, there is shown an illustration of the main participants in a typical internet card purchase transaction. For practical purposes, only three principal parties, i.e., the vendor A, the user B, and the card issuer C will be considered in describing the mode of operation in multiple party type transactions since the principle of the invention is equally applicable if one or more intermediary parties participate in the process.

Except in the case of the system described hereafter under the heading Non Digital Cards, the card 10 takes the form of a digital card i.e. a computer readable device such as a diskette, a compact disc (CD), a smartcard or the like, identified by a unique identification number (ID) and containing software for generating a unique one time number or word referred to as a Cybercoupon for use in a card transaction in place of the user's regular card number or for obtaining access to a local or remote computer or to a physical or virtual site.

DESCRIPTION OF THE ENCRYPTED CYBERCOUPON METHOD

The card 10 contains a program 12 (the Encryption Program) which uses a combination of proprietary and standard industry algorithms and several levels of security to generate a unique one-time Cybercoupon containing encrypted information including the card ID and information about the particular card transaction. The date and time of the clock in the user's computer 13 may be used as a parameter in generating the one-time number on which the Cybercoupon is based. The Cybercoupon emulates the format of a regular card of the type involved in the application for which the card is designed, for example for credit card applications the Cybercoupon emulates a regular credit card number as specified by international standards and the credit card industry.

In making a purchase or accessing a secure site, the Cybercoupon is substituted for the user's regular card number. The vendor A treats the Cybercoupon as a regular card number and where authorization by card issuer C s required before vendor A may give effect to the transaction, vendor A submits this Cybercoupon to card issuer C, usually via a payment network, with a request for authorization of the purchase order. Software at card issuer C's location decrypts the Cybercoupon and links it with the user's regular account number for processing. The roles of vendor A and card issuer C coincide in two-party transactions.

Method of Operation

The method of the invention, by way of illustration of one example of a typical application using the encrypted Cybercoupon method, comprises the following steps:

Issuing a Card

The card Issuer Program, running on a computer 16 at card issuer C's location, operates in conjunction with the card issuer's existing system. The user B makes application to card issuer C for card 10 as envisaged in this invention.

If the request is granted, the card issuer Program generates card 10 identified by a unique ID number and protected by a password. The card issuer C delivers the card 10 and the password to the user B separately for purposes of security.

Alternatively the password may be chosen by user B when making application for card 10, according to parameters specified by card issuer C, and this chosen password may be included in the user's application for card 10. The latter method eliminates the need for card issuer C to communicate the password to user B. Card issuer C need only communicate that the user's chosen password has been accepted. In order to activate card 10, user B must provide the correct password. Details of the user and other relevant information including the expiry date, the password, the card ID and the relevant encryption keys as described hereunder are stored in a database associated with the card issuer Program.

The Card and the Cybercoupons

The card 10 contains user program 12 being an Encryption Program which, on receiving the appropriate command from user B, generates a Cybercoupon. In transactions which need to be approved by card issuer C before being effected by vendor A, the Cybercoupon emulates a conventional card number. In the case of credit cards, such card numbers are regulated by international standards which are readily available and it is therefore unnecessary to provide details. Usually the first six digits are used as the BIN, identifying card issuer C and the last digit is used a check digit. A code is included in the Cybercoupon by arrangement with card issuer C to distinguish between a Cybercoupon and a conventional card number. The intermediate fields which are usually used for identifying the individual card are used for conveying the card ID and information about the monetary value of the transaction and where available, the identity of the vendor.

The method of encryption may use one of the several available forms of symmetric and/or asymmetric public/private key systems such as RSA, Elliptic Curve Cryptography or DSA. Card issuer C may choose to use the ID as a unique reference to the particular card 10 and to the user B to whom card 10 has been assigned, or alternatively card issuer C may chose to allocate a separate unique account number to card 10. Encrypting the Cybercoupon renders it unnecessary to encrypt the entire purchase order by means of SSL or any other form of encryption as is customary in on-line purchases, thus reducing significantly the overhead utilized by encryption processes in some other systems.

Figure 2:
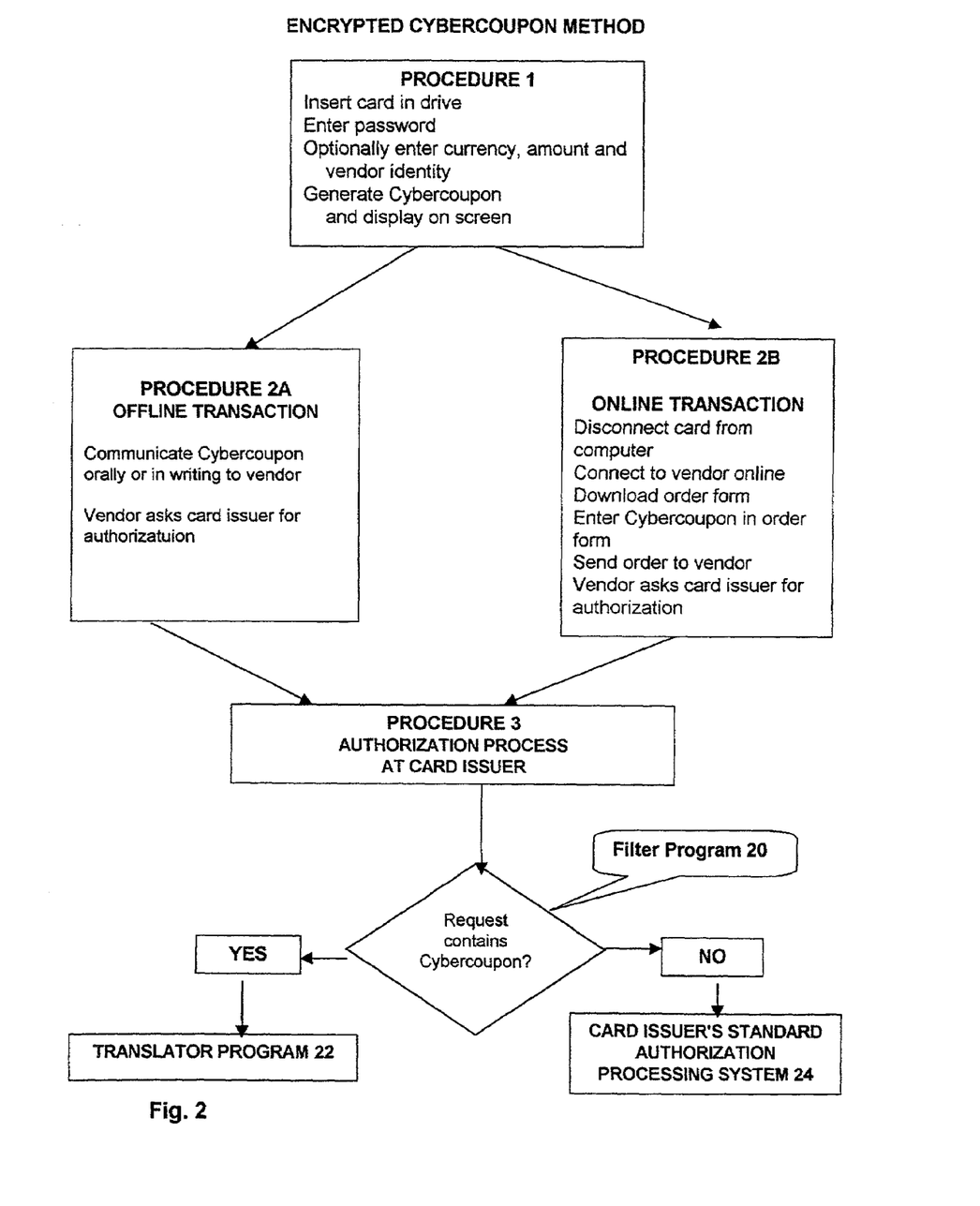
FIG. 2 illustrates diagrammatically the sequence of steps in effecting an online or an offline transaction from initiation by a user until it is passed by a vendor to a card issuer for authorization.

FIG. 2 diagrammatically illustrates the sequence of steps in a typical internet three party purchase transaction. The block marked Procedure 1 summarizes the process wherein user B inserts card 10 in computer 13 or relevant device, activates the card to obtain a login screen, enters the password and obtains a dialog box.

If an incorrect password is entered more than a preset number of times, an alert Cybercoupon which has the appearance of a regular Cybercoupon, is generated which enables user B to initiate a transaction, while, unknown to said user, the Cybercoupon contains a code advising card issuer C that an irregular attempt has been made to access card 10, enabling card issuer C to take such action as it considers appropriate.

Advertising material contained on card 10 may be displayed on the user's computer screen. The advertising may inter alia include links to web sites and may continue to be displayed on the screen after card 10 has been disconnected from user B's computer 13.

On receiving the appropriate command, the Encryption Program generates a dialog box on the user's screen in which the user may optionally enter the value of the purchase order which the user wishes to place on a vendor. This information is omitted in a two party transaction. A preferred embodiment of the invention assumes that card issuer C has allocated a unique identification code to each authorized vendor, which identification code is readily available to user B so that this information may also be added by user B in the appropriate position on the dialog box.

A Cybercoupon, emulating a conventional card number and containing, where applicable, encrypted details of the value of the purchase intended by the user and the vendor's identity, is generated by user 12 and is displayed on the screen of user B's computer 13.

Procedure 2a summarizes an offline transaction wherein user B transmits the Cybercoupon to vendor A orally, in writing or by any means of communication other than online. The vendor A treats the Cybercoupon as a regular card number. If the vendor A requires authorization by card issuer C before giving effect to the transaction, vendor A transmits said transaction with said Cybercoupon to card issuer C with a request for such authorization.

Procedure 2b represents a preferred method for an online transaction wherein card 10 is disconnected from computer 13 after the Cybercoupon has been generated and before computer 13 is connected online so as to avoid online intrusion. Connection is made to vendor A online via the web or directly by modem and the vendor's order form is downloaded. Where the vendor's purchase order form permits this to be done, user program 12 automatically enters the Cybercoupon in the vendor's purchase order form. Where the vendor's particular configuration does not permit such automatic entering of the Cybercoupon in the order form, it can be read from the screen and keyed manually by the user or it can be copied and pasted.

In an alternative procedure, not shown in the figure, the user may connect with the vendor online and download the vendors order form before generating the Cybercoupon. User B does not insert card 10 until required to insert a card number in a vendor's order form, whereupon user B inserts card 10 and generates the Cybercoupon, card 10 being automatically disconnected from computer 13 after generating the Cybercoupon so as to minimize exposure to online intrusion. The order form containing the Cybercoupon is transmitted to the vendor online via the internet or by direct modem connection.

A POS (Point of Sale) module is provided for use in an over-the-counter transaction by a vendor equipped with Point of Sale software, such as a retailer. On insertion of card 10 in the relevant drive of the vendor's computer, the POS module interacts with the user program 12 enabling the vendor's POS software to read the appropriate Cybercoupon generated by the user program 12 and utilize it in the same manner as a conventional credit card number. When making the over-the-counter purchase, if the vendor's computer is equipped with said POS software, card 10 is inserted into the appropriate drive of the vendor's computer. User program 12 is activated on entry of the correct password, a Cybercoupon generated as described above is read by the POS software and the information is transmitted to card issuer C with a request for authorization of the purchase.

If the vendors computer is not equipped with suitable POS software, the Cybercoupon may be displayed on the vendor's computer screen and entered into the appropriate credit card form manually.

When vendor A receives a purchase order containing a Cybercoupon, the Cybercoupon is treated as a regular card number, and vendor A processes the transaction in the vendor's usual manner. If authorization is required from card issuer C before the transaction is effected, a request is transmitted to card issuer C via the vendor's usual payment network, for authorization of the intended transaction.

Procedure 3 summarizes the start of the authorization process by card issuer C. The Cybercoupon contains a code which enables a Filter Program 20 at card issuer C's location to distinguish Cybercoupons from other numbers. The request for authorization is received by the Filter Program 20 which is associated with the card issuer program, and with the card issuer's standard program for processing card transactions 3. Requests which do not contain Cybercoupons are forwarded unaltered by the Filter Program 20 to card issuer C's standard authorization processing system 24, and those containing Cybercoupons are forwarded to a Translator Program 22, associated with Filter Program 20.

Figure 3:
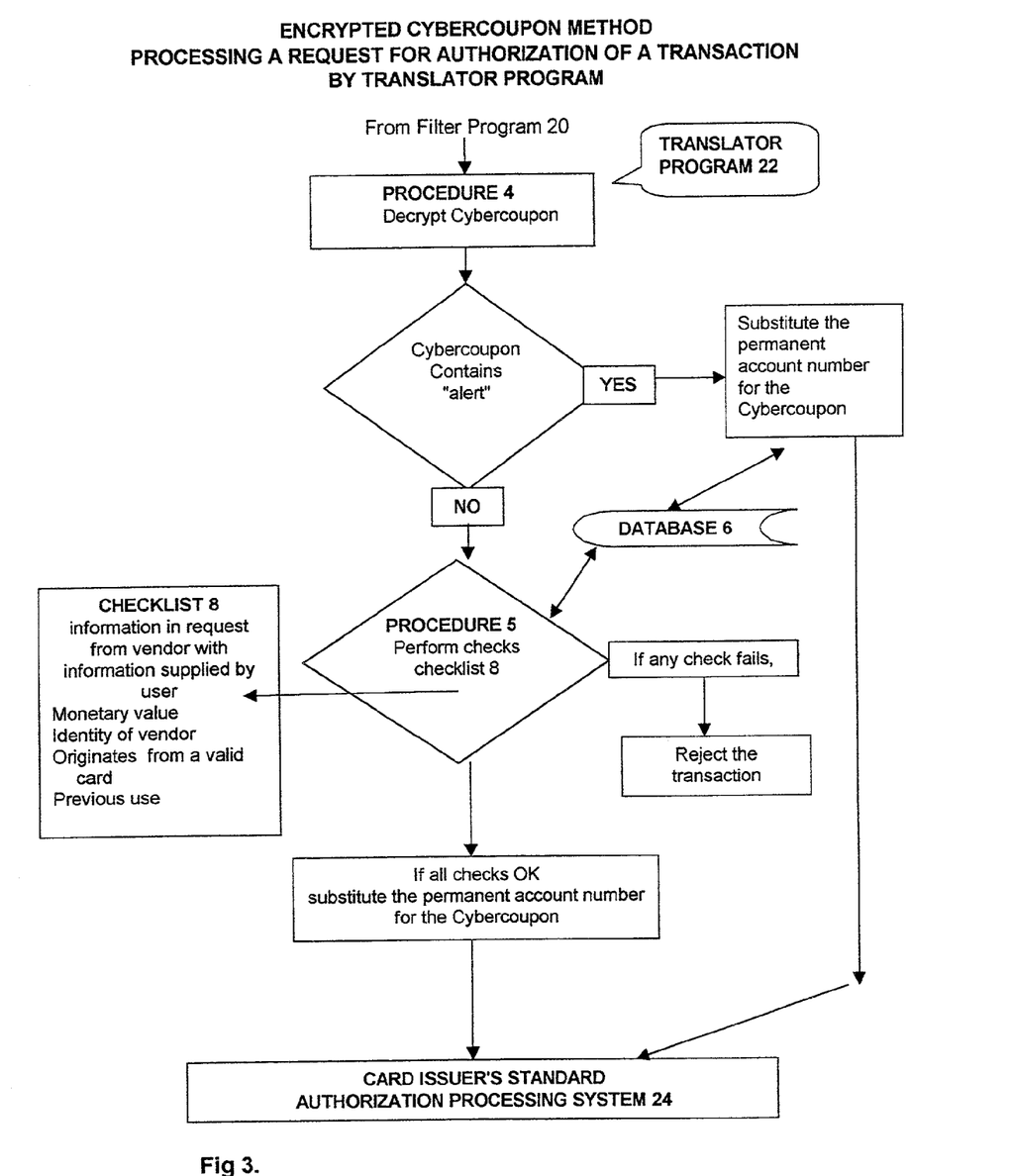
FIG. 3 illustrates diagrammatically the sequence of steps in processing a request for authorization by a card issuer.

FIG. 3 continues the authorization process, illustrating the steps involved after the Filter Program 20 forwards a request for authorization to the Translator Program 22.

Procedure 4 illustrates the Translator Program 22 operation, in receiving a request for authorization containing a Cybercoupon. The Translator Program 22 decrypts the Cybercoupon to reveal the ID, and where applicable, to reveal the monetary value of the transaction and identity of the vendor and an alert message which may be contained due to an irregular attempt to enter a password.

If the request contains an alert message, the record relating to the relevant ID in database 6, associated with the card issuer program and with card issuer C's standard authorization processing system 24, is marked as blocked pending further action; Translator Program 22 refers to an index in database 6, to identify the account number allocated to said ID, replaces the Cybercoupon with the account number and passes the request containing the alert message to the card issuer C's standard authorization processing system 24, for attention.

Procedure 5 summarizes the operation wherein a request which does not contain an alert code is further processed by Translator Program 22. Referring to database 6, the request is checked to ascertain whether the received Cybercoupon originates from a genuine card issued by card issuer C and whether the Cybercoupon has been used previously within a specified time period in relation to the particular card. Such specified time period which may elapse between the date a Cybercoupon has been used and the last date on which an identical Cybercoupon will be valid in association with said ID is a function of the encryption process and may vary from three months to several years, according to the requirements of the card issuer. The Translator Program 22 further compares where applicable, the purchase order value, and the vendor's identity as contained in the Cybercoupon with the information in the vendor's request for authorization.

If any of these checks fail, the request for authorization is rejected. If the request passes all the checks, Translator Program 22 refers to an index in database 6 to identify the card's account number in the card issuer's records, replaces the Cybercoupon with the account number and passes the request to card issuer C's standard authorization processing system 24, retaining a record of all incoming requests which contained Cybercoupons and the relevant account numbers which have been passed to card issuer C's processor.

The request for authorization is handled by card issuer C's standard authorization processing system 24 in its usual manner, checking all its usual parameters. After processing, the acceptance or rejection response is sent back to the Filter Program 20. If the response relates to a request which contained a regular card number, Filter Program 20 transmits the response directly to vendor A. If the response relates to a request that contained a Cybercoupon, the response is transmitted by Filter Program 20 to Translator Program 22 which substitutes the relevant Cybercoupon for the account card number before passing the response to the vendor.

When vendor A is a machine such as a physical access control, a vending machine or an ATM, a local computer or device replaces user B's computer 13 for the purpose of enabling access to card 10 and to the user Program 12. The local computer or device or a remote computer connected to the local device, contains the Filter Program 20 and Translator Program 22 for comparing the contents of the Cybercoupon with information held in an associated database and for granting or denying access based on the result of such comparisons.

In a two party transaction where vendor A and card issuer C are one and the same entities, such as aforementioned machines or banking services or information or entertainment providers and the like, the Filter Program 20 may be omitted. Depending on the configuration, there may be no need to distinguish between a Cybercoupon and a conventional card number. In other respects the procedures are analogous to those used in web purchases.

Figure 4:
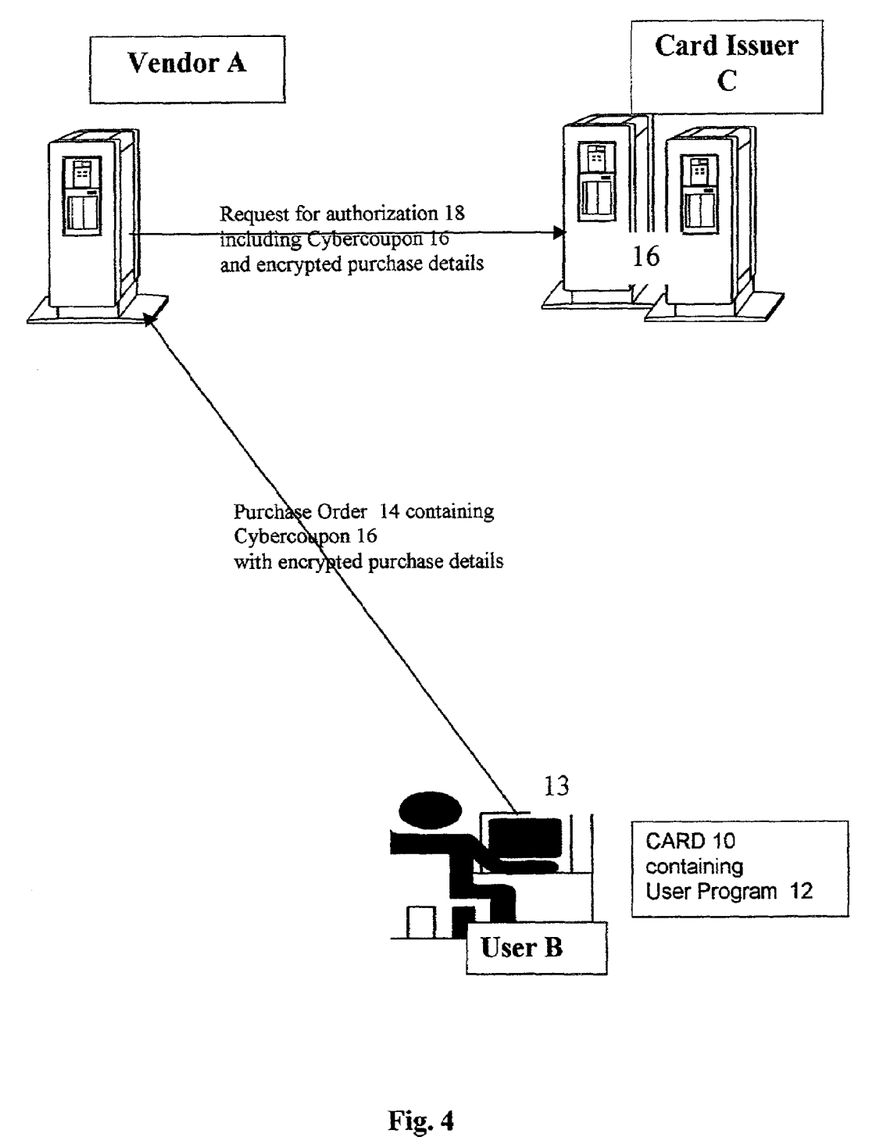
FIG. 4. outlines the main steps in a typical internet card purchase transaction.

FIG. 4. illustrates user B opening a web page containing purchase order form 14 for an order that user B wishes to place on vendor A. During the ordering process, when user B is required to supply his/her credit card number, user B inserts card 10 into the relevant drive of user B's computer 13. A dialog box and optionally an advertising banner appear on user B's computer screen.

User B may click on a link contained in the advertising text to enter an advertiser's web site, which typically will offer card shopping opportunities.

When ready to place an order, user B inserts a password in the relevant position in said dialog box. If the password is correctly entered Program 12 is invoked and a second dialog box appears in which user B specifies where applicable the value of the intended order and vendor A's standardized identity in the appropriate spaces in the dialog box.

On activating the appropriate button, Program 12 generates Cybercoupon 16 which emulates a conventional card number, contains the ID of card 10 and where applicable, encrypted information relating to the value of the order and where available vendor A's identity.

The Cybercoupon is displayed on the screen of user B's computer 13.

On activating the appropriate button, Cybercoupon 16 is inserted automatically in the space provided for a credit card number on vendor A's order form 14. (Alternatively user B may key Cybercoupon 16 manually in the appropriate position on said order form or a copy and paste method may be used).

Card 10 is disconnected from user B's computer after the Cybercoupon 16 has been generated. User B issues the appropriate command to send the completed purchase order form 14 containing Cybercoupon 16 to vendor A via the internet. Alternatively, the software may be programmed to cause card 10 to be automatically disconnected when User B confirms the order.

Vendor A treats Cybercoupon 16 as a conventional credit card number and after processing purchase order 14 in its regular manner, vendor A submits a request for authorization 18 to the card issuer C via vendor A's usual payment network which is not shown.

Figure 5:
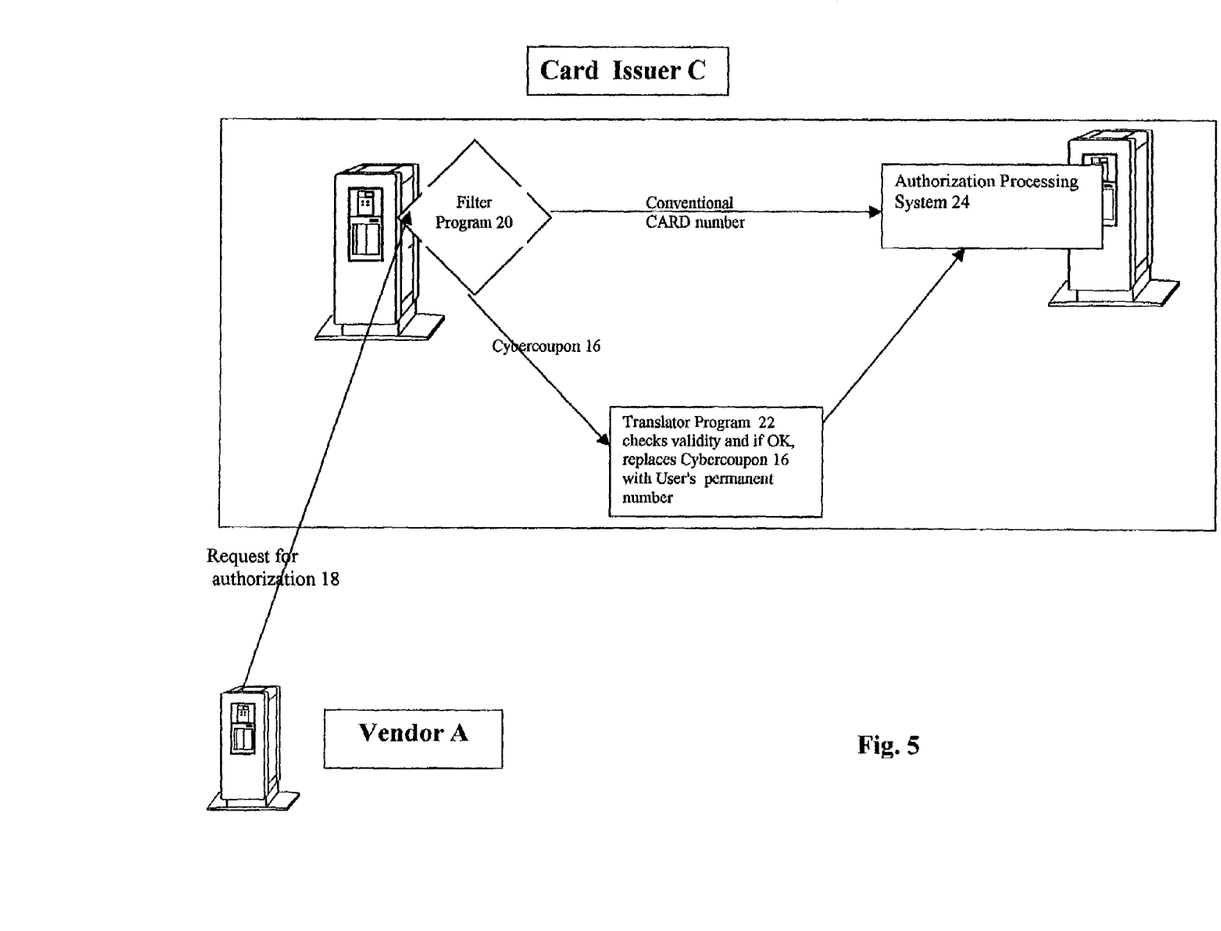
FIG. 5 outlines the process in which a typical purchase order received by vendor A is transmitted to Card issuer C and the manner in which it is processed by card issuer C.

FIG. 5 illustrates in greater detail the procedure when card issuer C receives request for authorization 18, the request is first directed to Filter Program 20 which identifies requests containing Cybercoupons.

As Request for Authorization 18 contains Cybercoupon 16, it is directed by Filter Program 20 to Translator Program 22 which decrypts Cybercoupon 16, revealing the ID of card 10, and checks whether Cybercoupon 16 contains an alert message due to an irregular attempt to enter a password. The record relating to request for authorization 18, if it contains said alert, is marked as blocked pending further action. Translator Program 22 refers to the index in its associated database 6 to identify card 10's account number in the card issuer's records, replaces Cybercoupon 16 with said account number and passes request for authorization 18 containing said alert to card issuer C's standard authorization processing system 24 for attention.

If Request for Authorization 18 does not contain the alert message, Translator Program 22 performs further checks which include comparison where applicable of the value of purchase order 14 and the identity of the vendor as contained in Cybercoupon 16, with the corresponding information contained in vendor A's request for authorization 18. Translator Program 22 also checks whether Cybercoupon 16 originates from a genuine card 10 issued by card issuer C and that the check digit in the Cybercoupon is valid. If any of the checks fail, Request for Authorization 18 is rejected and returned to vendor A. If all checks pass, Translator Program 22 replaces Cybercoupon 16 with the account number associated with card 10 as recorded in card issuer C's records and as referenced in the index maintained in Translator Program 22, before passing request for authorization 18 to Authorization Processing System 24.

A request for authorization which does not contain a Cybercoupon is passed by Filter Program 20 directly to Authorization Processing System 24.

Figure 6:
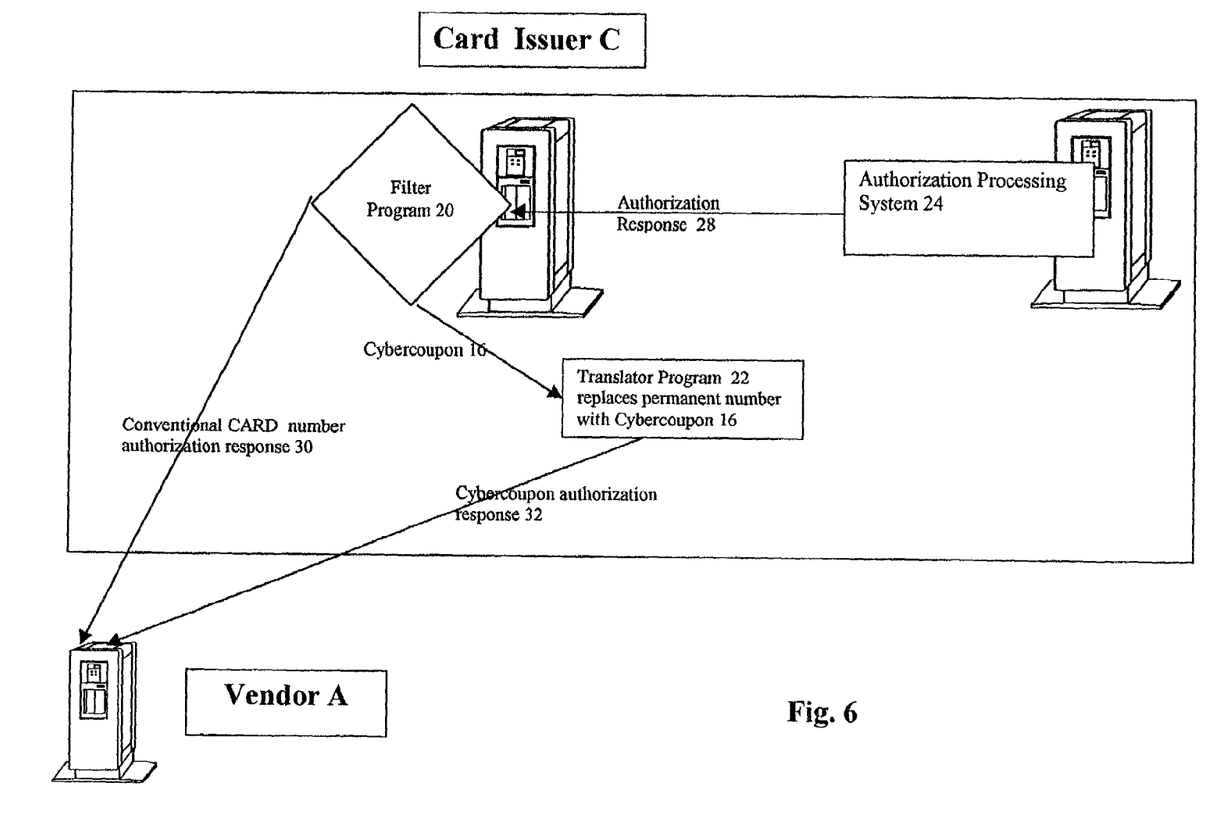
FIG. 6. outlines the manner in which card issuer C, responds to vendor A's request for Authorization.

FIG. 6 illustrates the process wherein Authorization Processing System 24 checks the validity of Request for Authorization 18 according to its usual criteria including expiry date, payment history, value of the purchase and the like and transmits acceptance Authorization Response 28 to Filter Program 20.

Filter Program 20 recognizes that Authorization Response 28 relates to Request for Authorization 18 which contained Cybercoupon 16 and accordingly directs the response to Translator Program 22 which replaces the account number with Cybercoupon 16 and sends Cybercoupon Authorization Response 32 to vendor A.

When Filter Program 20 receives an Authorization Response from Authorization Processing System 24 which relates to a Request for Authorization which does not contain a Cybercoupon, Filter Program 20 transmits Conventional Card Number Authorization Response 30 to vendor A without any change in the stated card number.

Figure 7:
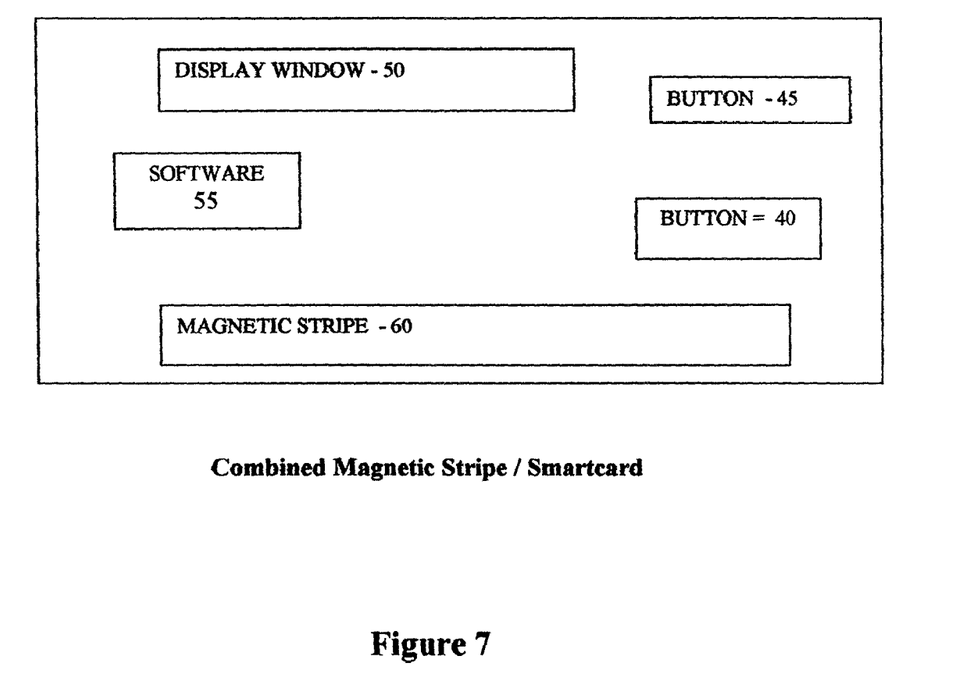
FIG. 7. illustrates a combined smartcard/magnetic stripe card

FIG. 7 is a block diagram illustrating an alternative embodiment of a card in the form of a Combined Magnetic Stripe/Smartcard in one unit 49, hereinafter referred to as a Combined Card. The purpose is to enable a User to choose to use Combined Card 49 either as a smartcard offering the security benefits of the present invention or to use the same card as a conventional magnetic card. User B presses button 40 to choose between magnetic stripe or smartcard mode. A unique ID is allocated to the Combined Card 49 and when in magnetic stripe mode Card 49 can be read by any conventional magnetic card reader using the card ID.

Software 55 in Combined Card 49 comprises a program for generating a Cybercoupon by any of the methods described herein. When in smartcard mode, an indicator in the ID is changed so as to indicate that the ID is invalid except in the format of a Cybercoupon and a message appears in display window 50 indicating that the smartcard feature is ready for use. User B presses button 45 to generate Cybercoupon 16 which is displayed in window 50.

When a Cybercoupon 16, is generated it appears in display window 50, enabling User B to read Cybercoupon 16 and manually enter it in a purchase order form or communicate it orally, by telephone or by any other means as described herein. Alternatively Cybercoupon 16 can be communicated online as described previously.

The Added Cybercode Method

The Added Cybercode Method is similar to the Encrypted Cybercoupon Method, except in regard to the manner in which the Cybercoupon is generated, the manner of authorization by the card issuer and in the fact that the Added Cybercode method may be used with either a digitally recorded or a non-digitally recorded card such as paper or plastic. Only those aspects of the Added Cybercoupon Method which differ from the Encrypted Coupon Method are dealt with in this description as other steps in the procedures are identical.

The card, is analogous to a booklet containing a quantity of single-use disposable numeric or alphanumeric Cybercodes, allocated by a card issuer's software and being programmed to be used only in a predetermined sequence as an add-on extension to a given user ID or in substitution for certain selected digits in the ID. Once used, a Cybercode becomes invalid for a subsequent transaction rendering information relating to the user's ID valueless to an unauthorized person. The ID amended by addition or insertion of said Cybercode is referred to as a Cybercoupon.

A program at the card issuer's location generates a card identified by a unique ID number associated with a list of Cybercodes in the form of numeric or alphanumeric Cybercodes to be used in a prearranged sequence as extensions to, or in substitution for certain of the digits in said ID number and each of which becomes invalidated after use. As in the Encrypted Cybercoupon method, the card issuer allocates a unique account number associated with said ID.

The card also contains an Added Cybercode Program which on receiving the appropriate instruction, selects the next unused Cybercode in said predetermined sequence and generates a Cybercoupon comprising said ID modified by the addition of said Cybercode as an extension to said ID or inserted in said ID in replacement of the equivalent number of digits in said ID in a predetermined position in said ID.

A program at the card issuer's location, incorporates a database that maintains a record of all ID's issued to Users, the relevant Cybercodes allocated for use with each ID and the sequence in which the Cybercodes are to be used. As soon as the program receives notification that a specific Cybercode has been used, it marks that Cybercode as reserved, awaiting a Request for Authorization from the vendor and marks it as being invalid for any further use except in association with the specific transaction for which it has been reserved.

When the user inserts a digital card into the appropriate drive of a computer, enters the correct password and executes the appropriate command, the next available Cybercode is displayed on the screen. The Added Cybercode Program contained in the card either adds said Cybercode as an extension to the ID or inserts it in substitution for the equivalent number of digits in the ID, thus creating a unique Cybercoupon. The selection of which digits are to be substituted is determined according to the card issuer's policy and the parameters of a regular card number used in a particular application such as a credit card for example.

In transactions wherein the vendor requires authorization from the card issuer before giving effect to the transaction, the program interacts with the user's browser or email program so that when the user places a purchase order with a vendor, information relating to the Cybercode which has been used and its position in the sequence, the value of the purchase, the vendor's identity and any other information considered relevant are automatically transmitted to the card issuer.

Simultaneously the program renders the Cybercode which has been used ineffective for further use and validates the next Cybercode in the predetermined sequence. An indicator in the ID indicates to the card issuer that the card number received is a Cybercoupon generated by the Aded Cybercode method.

As soon as the program at the card issuer receives said notification that a specific Cybercode has been used, it marks in the database that the specific Cybercode has been reserved, awaiting a request for authorization from the vendor and marks it as being invalid for any other use.

In an optional version, if the quantity of Cybercodes allocated for use with a specific ID in a predetermined sequence is denoted by Q, and each sequential transaction in the original sequence is referred to as $T_1, T_2, T_3, \ldots T_n$, then a cycle is completed when $T_q=Q$. The cycle is repeatable. The second cycle commences with transaction $T_{q+1}$ which is allocated the Cybercode originally allocated for transaction $T_1$ followed by transactions $T_{q+2}, T_{q+3}, \ldots T_{q+n}$, each being allocated a Cybercode in the same sequence as in the first cycle. A similar new cycle commences after every Q transactions. In this fashion, the user's ID may continue in use until its validity expires after passage of time in the normal course of events, or unless it is cancelled for another reason and there is no need to refer to the card issuer to replenish the Cybercodes. For additional security, the recycled order can be reversed or may commence at a predetermined offset from the original first Cybercode.

Different vendors may require varying periods between the time of receiving a purchase order and the time of applying to the card issuer for authorization. A consequent time lag may occur between the date and time on which the user places the order and the date and time on which the card issuer receives the relevant request for validation from the vendor. The software is therefore designed to calculate an acceptable time variation tolerance taking into account statistical information for various types of vendors and industries, the value of the purchase, and other relevant factors including the extent of the variance in the position of the quoted Cybercode from its allocated position in the predetermined sequence. A purchase order quoting an out of sequence Cybercode will thus be authorized with a statistically calculated level of safety, provided that such Cybercode falls within the calculated tolerance.

Non-Digital Cards

The Added Cybercode Method is not restricted to digital cards. The card may comprise a plastic or paper document containing the aforementioned list of Cybercodes and the ID in the form of written text. Alternatively the ID and the list of Cybercodes may be in separate documents. To generate the first Cybercoupon in relation to the card, the user selects the first Cybercode in the list, marks said Cybercode as having been used, and combines said Cybercode with said ID by adding said Cybercode as an extension to said ID or in substitution for the equivalent number of digits in a prearranged position in said ID. For successive Cybercoupons, the user selects the next available Cybercode in the predetermined sequence.

The user communicates said Cybercoupon to the vendor orally in person, by telephone, in writing or by any other available means.

In a preferred version, the card is protected from abuse by an unauthorized person. Said protection is effected by a prearranged supplementary code, whereby the user adds one or more digits, that are not written in said card, to each Cybercode, said Cybercode being invalid without the addition of said supplementary code.

Encrypted Password Method

In an alternative method, the card contains a store for storage of encryption keys and a commonly available encryption algorithm such as RC4 for example. While this method may also use asymmetric keys, a version preferred for simplicity using symmetric keys is described.

In order to generate a password for gaining access to a local or remote computer, the user requests permission to logon to a server and the server responds with a challenge. The user program extracts a key from said store and uses said key to encrypt said challenge using said standard algorithm. The user transmits the encrypted challenge together with the card ID to the server. The server uses the ID to identify the key and uses the key to decrypt the response message. The user is authenticated if the decrypted response from the user reproduces accurately the original challenge.

The keys and encryption algorithm can be used for encrypting text for local storage or for transmission to remote destinations.

Asymmetric keys may be used for greater security, the equivalent procedure being self-evident to persons acquainted with encryption technology.

The DTMF-Card

A method is provided for effecting card transactions by telephone, by radio or other means of audio communication, by means of a card referred to as a DTMF-card which incorporates a commercial, readily available Dual Tone Multifrequency (DTMF) Generator in addition to a user program as described herein. The user program comprises any one of the programs for generating a Cybercoupon as described earlier which interacts with said DTMF generator so as to convert the generated Cybercoupon into an audio tone Cybercoupon in which each digit is converted to a specific audio frequency in accordance with international telephony standards.

Since DTMF generators are well known in the telephony field it is not considered necessary to describe their operation in detail.

The user generates a Cybercoupon by one of the methods described above and said Cybercoupon is converted to said audio tone Cybercoupon and said user program transmits said audio tone Cybercode to the vendor directly by modem or by any other available means of communication.

In an alternative embodiment the user program interacts with the voice card on the user's computer to convert a Cybercoupon generated by the program to audio tones which are reproduced via the computer speaker. The microphone of the telephone or other communication device is placed close to said speaker in order to communicate the audio tone Cybercoupon to the vendor.

Yet another alternative self-contained embodiment operates without the use of a separate computer. The card includes a keypad, a speaker and optionally a screen in addition to said user program and DTMF generator, thus enabling a Cybercoupon to be generated, converted into audio tones and transmitted by placing the speaker on the card close to the microphone of the telephone or other means of audio communication.

The DTMF-card may also be used in association with a telephone calling card. Conventional telephone calling cards require a user to enter an ID (or password) and PIN which are transmitted to the telephone company over the telephone communication system where they are exposed to interception, enabling a possible fraudster to gain access to the telephone company's system and to dial any telephone number of choice. Said DTMF-card avoids the necessity of communicating the plain language password and PIN over the communication system. Instead, said password and PIN are entered on said DTMF-card causing said audio tone CyberCoupon to be generated. Said user transmits said audio tone Cybercoupon in place of the permanent password and PIN to the Telephony Service Provider enabling fraud-protected access to calling card type services.

All other procedures including issue of the DTMF cards, generation of a Cybercoupon and authorization of a transaction by the card issuer are analogous to the card procedures previously described. The card issuer may be the telephony service provider or a third party such as credit card issuer or acquirer.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

I claim:

1. A method for enabling secure authentication of a user in a computerized card access transaction while performing said transaction via a computer or other device, said transaction typically associated with at least one activity performed by a user in transacting with a vendor, said vendor being a person, an entity, a computer or a machine and wherein said at least one activity is performed by the user from among a group of activities relating to acquiring of goods or services, and/or access to a computer, a network and/or virtual and physical sites, said method comprising:

providing the user with a physical card by a card issuer associated with said vendor, said card being embodied in a portable, digitally recordable medium having stored thereon a user program that does not require storage of any passwords, programs, secret keys or any component of said user program on a computer thereby preventing the possibility of such passwords or other sensitive information becoming disclosed either to an unauthorized person who may gain physical access to the user's computer or by any form of online intrusion and to enable complete portability of the method so that it is not restricted to a specific programmed computer, but is usable in conjunction with any computer equipped with a compatible operating system;

allocating to said physical card a unique identification number (ID), a password, and where applicable, an account number;

recording in a database associated with the card issuer for each card so provided, details of said ID and said password together with details of the user to whom the card has been provided;

initiating the card transaction in one of outline and online modes, by inserting said card into the appropriate drive of the user's computer or by connecting said card to said computer in any other manner while the computer is offline;

activating said card causing it to display a login window on the computer screen;

entering the appropriate password in said login window which appears on the user's screen, so as to activate said program on said card causing a further login window to appear;

entering required information in said login window;

generating a unique one-time Cybercoupon comprising a message containing the user's ID and other relevant information, wherein during said offline mode, said card transaction is initiated by:

communicating said Cybercoupon as part of said card transaction, to the vendor in any manner not involving online communications, and wherein during said online mode, said card transaction is initiated by:

disconnecting said card from the computer;

connecting the computer online;

communicating said Cybercoupon as part of said card transaction, to the vendor via online communications;

receiving said Cybercoupon at the vendor, processing, by the vendor of said request for authorization in accordance with its standard criteria;

authorizing the card transaction, if said Cybercoupon is determined to be valid and if standard criteria are met;

or otherwise rejecting the card transaction.

2. The method of claim 1 wherein when said card is activated, advertising material contained in said user program or generated by the program on said card is optionally displayed on a screen.

3. The method of claim 1 wherein when the computer is connected online, a vendor's order form is downloaded; and said Cybercoupon is inserted on said order form in the position requiring a card number.

4. The method of claim 1 wherein said password may comprise at least a single character string and wherein said user program is designed so that if an incorrect password is entered more than a predetermined number of times, the user gains entry to said user program and a fictitious Cybercoupon is generated having the appearance of a regular Cybercoupon but containing a code which indicates to the card issuer, that an irregular attempt has been made to enter the password, thus enabling the card issuer to take such steps as it considers appropriate.

5. The method of claim 1, wherein said user program stored on said physical card comprises a number generator and an encryption program, which, on receiving the appropriate command, generates said one-time Cybercoupon in encrypted form, containing encrypted information relating to the card ID and, where applicable, the vendor identity and other information relating to the card transaction and wherein said processing by the vendor includes decrypting said Cybercoupon.

6. The method of claim 5, wherein the vendor's right to give effect to said card transaction is subject to authorization by the card issuer in accordance with a method comprising:

transmitting details of the proposed transaction by the vendor via the vendor's usual communication network to the card issuer with a request for authorization of said transaction;

receiving by a Filter Program associated with the card issuer of said request from said vendor for authorization of said transaction;

discriminating by said Filter Program between a request for authorization containing a Cybercoupon generated by the encrypted cybercoupon method and requests containing other card numbers;

forwarding by said Filter Program of a request for authorization which does not contain a Cybercoupon, to said Card Issuer's standard system for processing requests for authorization;

processing of said request and responding directly by said card issuer to said vendor;

transmitting a request which contains a Cybercoupon to a Translator Program associated with said Filter Program;

decrypting of said Cybercoupon by said Translator Program to disclose the ID and other information stipulated by the user, the identity of the vendor and whether or not said Cybercoupon contains an alert message indicating that an irregular attempt has been made to access said card;

replacing, in a message which contains said alert, said Cybercoupon with said ID and forwarding said request to the card issuer's standard system for processing said requests and marking the record in said database relating to the relevant ID as blocked and requiring further action by said card issuer in accordance with said card issuer's policy;

checking a Cybercoupon which does not contain said alert, to ascertain whether said Cybercoupon has been used previously within a prescribed period of time, whether it originated from a valid original card issued by said card issuer to said user and that, where applicable, other information and vendor identity stipulated by said user coincide with the information in the request for authorization received from said vendor;

rejecting said request if said request fails any of said checks and notifying said vendor via said Filter Program accordingly;

substituting, in a request which has passed all said checks, the relevant ID number for said Cybercoupon and forwarding said request with said substituted ID number, to the card issuer's standard system for processing card transactions;

retaining a record of all incoming requests which contained Cybercoupons and said relevant ID numbers which have been passed to said card issuer's standard processing system;

processing of said request for authorization by said card issuer's standard processing system in accordance with said card issuer's usual criteria;

responding by said card issuer's said standard processing system to said Translator Program that said request has been rejected if said criteria have not been met or that said request has been accepted if said criteria have been met;

replacing, by said Translator Program of said ID number with said original Cybercoupon;

transmitting said response containing said Cybercoupon from said Translator Program to said vendor via said Filter Program.

7. The method of claim 1, wherein said card contains a quantity of Cybercodes, listed in a specific sequence, which sequence can be recycled when the last Cybercode in the list has been used, said list being associated with said card ID and said user program modified to generate a Cybercoupon by selecting one said Cybercode at a time from said list in said sequence and combining said Cybercode with said ID, said combination of ID and Cybercode constituting said Cybercoupon, said Cybercoupon being generated and processed with said Cybercode in a method comprising:

allocating to said card, in addition to said details, said quantity of Cybercodes listed in said predetermined sequence as well as a unique identification number (ID) containing an indicator which indicates that said ID is invalid unless it has been modified by one of said Cybercodes, said user program being designed to select said Cybercodes one at a time in accordance with said sequence, using said one selected Cybercode to create a Cybercoupon comprising said ID modified by the addition of said Cybercode to said ID;

maintaining at the Card issuer, a database containing, in addition to said details, said list of Cybercodes in their specified sequence;

selecting by said program when activated, while the computer is offline, of the next unused Cybercode in its predetermined sequence in said list contained on said card;

generating a Cybercoupon comprising a combination of said ID and said Cybercode and displaying it on a screen;

communicating, in an offline transaction, said ID to the vendor, in any manner not involving online communication;

connecting said computer online;

and in an online transaction, communicating said ID to the vendor online;

and in both online and off line transactions, communicating said Cybercoupon to said card issuer, by interaction of said user program with said user's email program or browser or by any other means of communication, together with details of said transaction including where relevant, the currency, the monetary value of the transaction and the identity of the vendor;

receiving by said card issuer of said notification from said user and entering of information contained in said message received by the card issuer into said database associated with said card issuer's system and marking in said database of said Cybercode as contained in said notification as having been used and awaiting a request for authorization from said vendor;

receiving said communication by said vendor from the user;

transmitting by said vendor to said card issuer of said communication with a request for authorization of the transaction;

receiving of said request at said Card Issuer's node;

detecting from said indicator in said ID that said ID requires an authentic valid Cybercode in order to be validated;

comparing said request with the communication received from the user and with data stored in said database to ensure that within predefined deviation parameters, said Cybercode is valid and in the correct position in the predetermined sequence;

comparing that information contained in said request for authorization received from said vendor matches the information contained in said notification received from said user;

rejecting a request which fails any of said checks and notifying said vendor accordingly.

8. The method of claim 7, varied in that the user sends a Cybercoupon in place of said ID to the vendor and does not communicate with the card issuer and wherein authorization by the card issuer is performed in accordance with a method comprising:

transmitting details of the proposed transaction, including said Cybercoupon, by the vendor via the vendor's usual communication network to the card issuer with a request for authorization of said transaction;

receiving of said request from said vendor initially by a Filter Program at said Card Issuer's node;

differentiating by said Filter Program between requests containing Cybercoupons generated by said added Cybercode method and requests containing other card numbers;

directing by said Filter Program of a request which does not contain said Cybercoupon to the card issuer's standard processing system;

processing of said request and responding directly by said card issuer to said vendor;

forwarding a request which contains said Cybercoupon to a Translator Program associated with said Filter Program;

detecting by said Translator Program of the ID and the Cybercode contained in said request;

comparing the data stored in said database to ensure that within predefined deviation parameters, said Cybercode is in the correct position in the predetermined sequence and marking that it has now been used;

rejecting a request which fails any of said checks and notifying said vendor accordingly via said Filter Program;

substituting, in a request which has passed all checks the relevant ID in place of said Cybercoupon and transmitting said request with said substituted ID, to the card issuer's standard processing system;

retaining a record of all incoming requests which contained said indicators and said relevant ID's which have been passed to the card issuer's standard processing system;

processing of said request for authorization by the card issuer's standard processing system in accordance with its usual criteria;

responding by said card issuer's said standard processing system to said Translator Program that said request has been rejected if said criteria have not been met or that said request has been accepted if said criteria have been met;

replacing, by said Translator Program of said ID number with said original Cybercoupon in respect of a request which was originally received containing a Cybercoupon; and transmitting said response containing said Cybercoupon by said Translator Program via said Filter Program to the vendor.

9. The method of claim 7, wherein said processing procedure contains a calculating means for statistically determining an acceptable tolerance in variation from said predetermined sequence of said Cybercode, taking into account such factors as the norm for the particular industry between the time and date on which a vendor receives an order and the time and date on which a Card Issuer receives the relevant request for validation from said vendor, and the value of the order, so that a transaction quoting an out of sequence Cybercode will be authorized with a statistically calculated level of safety, provided that such Cybercode falls within said calculated variation tolerance.

10. The method of claim 1 wherein the card contains a store for storage of encryption keys and a commonly available encryption algorithm for encrypting a Cybercoupon for use as a password in the form of a challenge, using symmetric keys such as, but not limited to, RC4 or DES, said challenge being used for controlling access to a computer in accordance with a method comprising:

requesting by the user of permission to logon to a server;
responding by said server with a challenge;
extracting by said user program of a key from said store;
generating a Cybercoupon by using said key in conjunction with said algorithm to encrypt said challenge;
transmitting said Cybercoupon together with the card ID to the server;
using the ID by the server to identify the key;
using said key to decrypt said Cybercoupon;
comparing the decrypted Cybercoupon with the original challenge; and
authenticating the user if said response is identical to said challenge.

11. The method of claim 10 using asymmetric keys.

12. The method of claim 1 wherein the card contains a store for storage of encryption keys and a commonly available encryption algorithm for encrypting text which encrypted text can be stored securely on a local or remote computer or transmitted as a message electronically.

13. The method of claim 12 wherein said user program interacts with the user's email program to generate secure encrypted messages by email.

14. The method of claim 1, wherein said card takes the form of a combined magnetic stripe card and a smartcard in one unit, enabling said user to choose to use said card either as a conventional magnetic card or as a smartcard, said combined card containing a conventional magnetic stripe and any one of said user program described herein for generating Cybercoupons or passwords.

15. The method of claim 1 wherein said card contains a Dual Tone Multifrequency (DTMF) Generator in addition to said user program which interacts therewith in accordance with a conversion method so as to convert said Cybercoupon to an audio tone Cybercoupon, each digit in said Cybercoupon being converted to a specific audio frequency in accordance with international telephony standards.

16. The method of claim 1 wherein said card contains a store for storage of encryption keys and a commonly available encryption algorithm for encrypting a Cybercoupon for use as a password in the form of a challenge, using symmetric keys or asymmetric keys and wherein said card contains a Dual Tone Multifrequency (DTMF) Generator in addition to said user program which interacts therewith in accordance with a conversion method so as to convert said Cybercoupon to an audio tone Cybercoupon, each digit in said Cybercoupon being converted to a specific audio frequency in accordance with international telephony standards, said challenge being used for controlling access to a remote computer in a method comprising:

generating a request for permission to logon to a server;
converting said request to an audio signal recognizable by said server;

transmitting said audio signal to the server;
responding by said server with an audio challenge;
converting said audio challenge to text;
extracting by said user program of an encryption key from said store;
using said encryption key to generate a Cybercoupon comprising said challenge encrypted using said algorithm;
converting said Cybercoupon to an audio tone Cybercoupon and converting said ID to an audio signal;
transmitting said audio tone Cybercoupon in response together with the audio card ID to the server;
using the ID by the server to identity said encryption key;
using said encryption key to decrypt said Cybercoupon;
comparing the decrypted response with the original challenge;
authenticating the user if said response is identical to said challenge.

17. The method of claim 15 wherein said DTMF card is self-contained and operates without the use of a separate computer, said DTMF card including a keypad, a speaker and optionally a screen in addition to said user program and said DTMF generator, thus enabling a Cybercoupon to be generated, converted into audio tones and transmitted by placing the speaker on the card close to the microphone of the telephone or other means of audio communication.

18. The method of claim 15 wherein said DTMF-card is used in association with a telephone calling card provided by a telephony service provider, said Cybercoupon comprising the user's ID and PIN encrypted and converted to audio signals as described.

19. The method as recited in claim 1, whereby a POS Module is provided at an outlet equipped with commercial Point of Sale (POS) software, said module being designed to interact with said outlet's POS software enabling said POS Module to activate said card, read said Cybercoupon generated by said card and treat said Cybercoupon as a regular card number for processing in the usual manner adopted by said outlet.

20. A system for enabling secure authentication of a user in a computerized card access transaction while performing said transaction via a computer or other device, said transaction typically associated with at least one activity performed by a user in transacting with a vendor, said vendor being a person, an entity, a computer or a machine and wherein said at least one activity is performed by the user from among a group of activities relating to acquiring of goods or services, and/or access to a computer, a network and/or virtual and physical sites, said system comprising:

a physical card provided by a card issuer, said card being embodied in a portable, digitally recordable medium having stored thereon a user program that does not require storage of any passwords, programs, secret keys or any component of said user program on a computer thereby preventing the possibility of such passwords or other sensitive information becoming disclosed either to an unauthorized person who may gain physical access to the user's computer or by any form of online intrusion and to enable complete portability of the method so that it is not restricted to a specific programmed computer, but is usable in conjunction with any computer equipped with a compatible operating system, said physical card having allocated thereto at least a unique identification number (ID) and a password, and where applicable, an account number; and a database associated with the card issuer for each card having recorded therein, details of said ID, said password and where applicable, said account number, together with details of the user to whom the card has been provided;

wherein said card is used to perform a card transaction initiated by:

inserting said card into the appropriate drive of the user's computer or otherwise connecting said card to said computer while the computer is offline;

activating the said card causing it to display a login window on the computer screen;

entering the appropriate password in said login window which appears on the user's screen, so as to activate said program on said card causing a further login window to appear;

entering required information in said login window;

generating a unique one-time Cybercoupon comprising an encrypted message containing the user's ID and other relevant information, and wherein during said of f line mode, said card transaction is initiated by:

communicating said Cybercoupon as part of said transaction, to the vendor in any manner not involving online communications, and wherein during said online mode, said card transaction is initiated by:

disconnecting, automatically, said card from the computer;

connecting the computer online;

communicating said Cybercoupon as part of said card transaction, to the vendor via online communications;

receiving said Cybercoupon at the vendor, and processing said card transaction by the vendor;

transmitting by the vendor to the card issuer via a communication network, a request for authorization of the card transaction, if the vendor requires authorization by the card issuer before said vendor is entitled to give effect to said transaction;

receiving said request for authorization at the card issuer;

processing, by the card issuer of said request for authorization in accordance with its standard criteria;

authorizing the card transaction, if said Cybercoupon is determined to be valid and if the card issuer's standard criteria are met;

or otherwise rejecting the card transaction.

* * * * *